Jan. 13, 1959 F. G. WILLIAMS, JR 2,868,020
APPARATUS FOR APPLYING A LIQUID SAMPLE
Filed Feb. 24, 1955 3 Sheets-Sheet 1
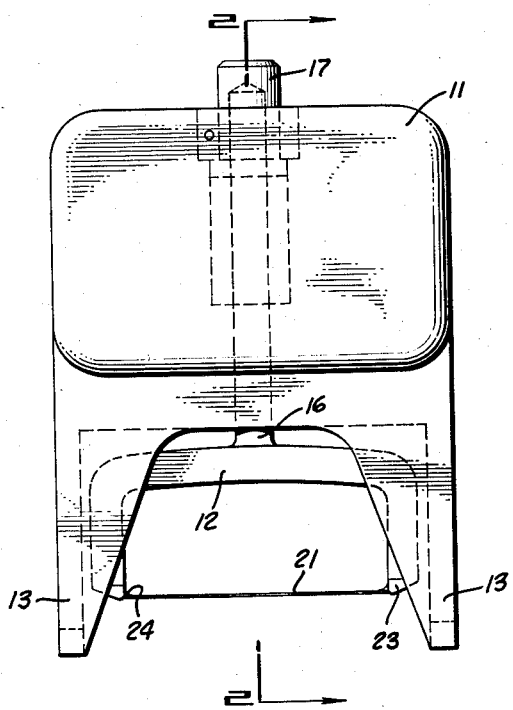
FIG_1
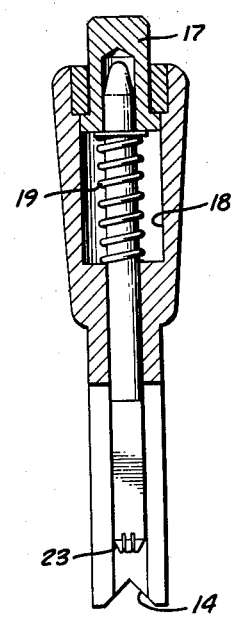
FIG_2
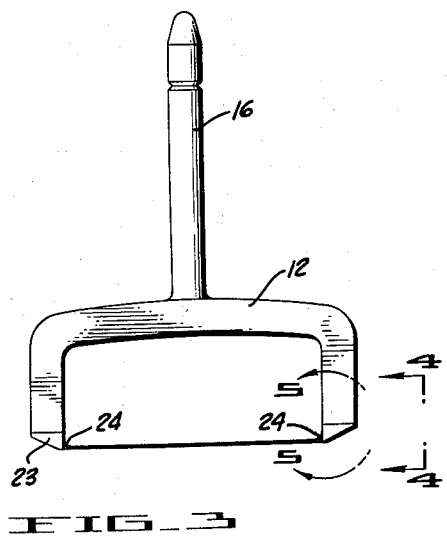
FIG_3
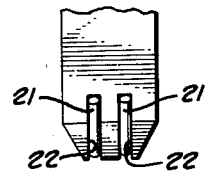
FIG_4
Fred G. Williams Jr.
INVENTOR.
BY
ATTORNEYS Jan. 13, 1959  F. G. WILLIAMS, JR  2,868,020
APPARATUS FOR APPLYING A LIQUID SAMPLE
Filed Feb. 24, 1955  3 Sheets-Sheet 2
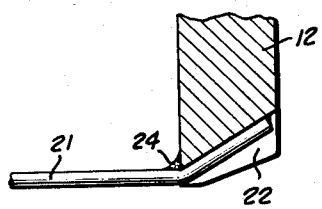
FIG_5
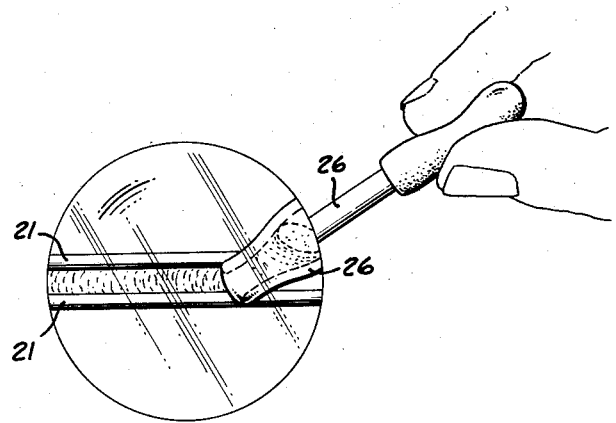
FIG_6
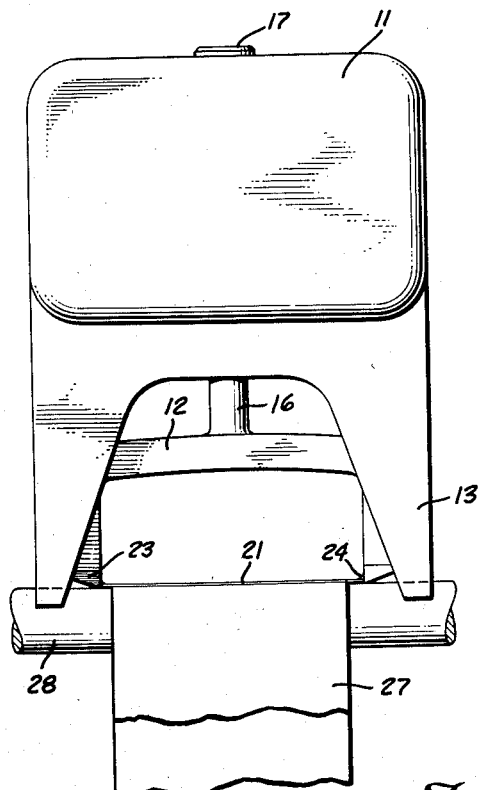
FIG_7
Fred G. Williams Jr.
INVENTOR.
BY
ATTORNEYS

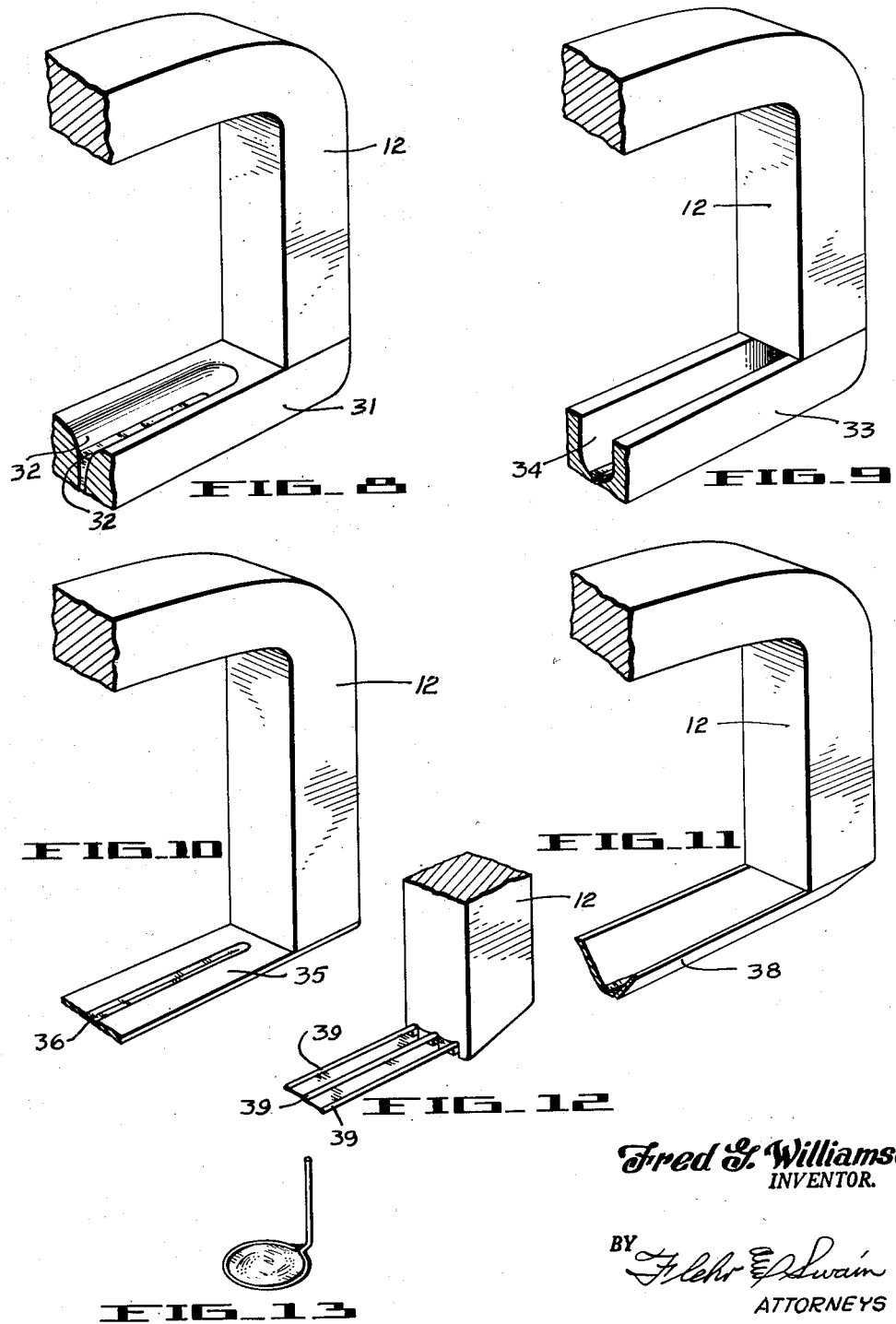

_United States Patent Office_

2,868,020
Patented Jan. 13, 1959

2,868,020

APPARATUS FOR APPLYING A LIQUID SAMPLE

Fred G. Williams, Jr., Redwood City, Calif., assignor to Beckman Instruments, Inc., Fullerton, Calif., a corporation of California Application February 24, 1955, Serial No. 490,262

6 Claims. (Cl. 73—432)

This invention relates generally to apparatus for applying a liquid sample, and more particularly to apparatus capable of applying a uniform liquid sample to a sample carrier.

In making one type of electrophoresis analysis, a strip of filter paper or like absorbent material is draped over a rod with its ends dipping into electrolyte cells. After the paper is saturated with a solution of proper pH, the sample solution is applied across the strip in such a manner that the solution tends to flow downwardly along the two depending portions. An electrical current of controlling value is caused to flow through the strip whereby the various protein fractions are separated. After a predetermined time, the strip is removed and dried. The protein fractions are fixed by heat coagulation. A suitable dye is then applied whereby the fractions are made visible. In general, the variation in color density along the strip is proportional to the concentration of the protein fractions present.

If the protein or other solution to be observed is applied irregularly across the strip, then the separations will become irregular and it is difficult to discern the various protein fractions. It is desirable to apply the sample in the form of a stripe across the paper strip. The separation will then be in the form of bands which may be directly scanned for color density.

It is a general object of this invention to provide a device which facilitates application of a liquid sample as a stripe to a predetermined area of a sample carrier.

It is a further object of this invention to provide a device of the above character in which the amount of sample applied to the sample carrier is accurately controlled.

It is a further object of this invention to provide a device of the above character which permits rapid application of the sample.

These and other objects of my invention will be more clearly apparent from the following description in which the preferred embodiment of the invention has been set forth in detail.

Referring to the drawings:

Figure 1 is a side elevational view of one embodiment of the apparatus of my invention;

Figure 2 is a sectional view taken along the lines 2—2 of Figure 1;

Figure 3 is a side elevational view of the sample striper bow;

Figure 4 is a side elevational view of a portion of the bow showing the wire accommodating grooves;

Figure 5 is an enlarged view of the portion 5—5 of Figure 3;

Figure 6 shows the sample being applied to the striper apparatus;

Figure 7 is a side elevational view showing the sample striper as used in conjunction with the electrophoresis paper; and Figures 8–13 show various bounding structures which may be employed.

In general, the invention consists of a bounding structure to which the liquid sample is adherent. The dimensions of the bounding structure are such that the surface forces of the liquid will maintain a top and bottom surface of the sample. Transfer of the sample from the structure to the sample carrier is effected by contacting the bottom surface of the sample with the carrier. Means may be provided to advance and retract the structure for a striping or sample applying operation.

Preferably, a pair of parallel spaced wires that are attached at their ends to a mounting bow form the bounding structure. The spacing of the wires is such that when liquid sample material is applied between the wires, a film of liquid sample material is formed between the wires by the surface forces. The apparatus may include a frame or housing with an arrangement whereby the bow is advanced from a retracted to an extended position for a striping or sample applying operation.

Referring to the drawings (Figures 1 and 2) the device includes a housing or frame 11, and a wire supporting bow 12. The housing is constructed to form legs 13 which are U-shaped in section to slidably accommodate and guide the end portions of the bow. V-shaped notches 14 are shown in the extremities of the bow to facilitate engagement with the rod of a paper rack, in a manner which will be presently described.

Means are provided whereby the bow can be moved between retracted and advanced position. Thus, the bow is attached to a stem 16 which carries a push button 17 and which is slidably accommodated in the bore 18. A compression spring 19 is accommodated with the bore and serves to urge the bow toward its retracted position.

The spaced parallel wires 21 carried by the bow are preferably held under tension. Various expedients can be employed for attaching of the wires to the bow. In the construction illustrated, the extremities of the bow are provided with slits to receive the wires 21. In manufacture, the wires are tensioned after being placed in the slits, and then the bow extremities are compressed to grip the wires. Thereafter, suitable solder is applied and the extremities of the bow may be chamfered as indicated at 23. Creeping of the liquid sample from the wires to the extremities of the bow can be prevented by applying fillets 24 of suitable material, such as wax or synthetic resin.

Operation of the apparatus is as follows: Referring to Figure 6, a quantity of the solution is placed in a conventional pipette 26. The tip of this pipette is contacted with the wires 21 and as the pipette is drawn along the wires, a film of the sample is formed by the surface forces. The pipette is withdrawn after the film has been applied over the entire length of the wires. Assuming that it is desired to apply the sample to the strip of filter paper 27, which is draped over the supporting rod 28, the legs 13 of the housing are engaged with the rod 28 at points adjacent the edges of the strip. The button 17 is depressed whereby the bow is advanced to contact the wires with the strip 27. Immediately as the wires contact the strip the sample is transferred to the paper over a narrow uniform stripe or area defined precisely by the spacing of the wires. After such transfer of the sample, the wires are retracted and the device is removed from the rod 28.

Although the bounding structure described comprises two parallel spaced wires, any bounding structure having dimensions such that a competent top and bottom surface of sample is maintained may be employed. In Figures 8 through 13, I have illustrated several bounding structures which are suitable. The member 31 forming the bounding structure of Figure 8 has an opening with opposed sample supporting surfaces 32 forming a V-shaped trough. The member 31 is supported by the bow 12. The member 33 of Figure 9 presents a U-shaped trough. The member 35 of Figure 10 is relatively thin and its opening 36 is in the form of a V. The member 38 of Figure 11 is relatively thin and formed to present a V-shaped trough. It is to be noted that the amount of sample held by the bounding structures is dependent upon the amount applied by the pipette and the configuration and spacing of the structure. Thus, the structure of Figure 8 holds a greater amount of sample than the structure of Figure 9. Figure 12 shows three parallel spaced wires 39 for holding a larger sample than the two wire structure described.

It will be evident that the device described above greatly facilitates the application of a sample to a sample carrier. The amount of liquid applied to the carrier is accurately determined by the pipette and the bounding structure. By varying bounding structures, it is possible to suit the device to varying amounts of sample desired. The sample is applied over a uniform and sharply defined stripe of the carrier, without requiring any special skill on the part of the operator. Thus, the invention eliminates the possibility of human error in the sample applying operation.

Although the sample applicator has been described with reference to electrophoresis apparatus, it is evident that it may be used wherever the amount of liquid to be applied to a sample carrier must be accurately controlled or applied over a uniform, sharply defined stripe. For example, it may be used in chromatographic analysis.

I claim:

1. In a device for applying a liquid sample to a sample carrier, a pair of spaced parallel wires adapted to carry a film of the sample between the same, a bow serving to mount the wires and having its extremities attached to the extremities of the wires, a frame having a pair of legs extending adjacent the ends of the bow, the extremities of said legs being notched for engagement with a member over which a paper strip is draped, said legs forming guideways for the end portions of the bow, means for moving the bow with respect to the frame between retracted and advanced positions, said bow in its advanced position bringing the bottom surface of said liquid sample into contact with the sample carrier, and spring means serving to urge said bow towards the retracted position.

2. In apparatus for forming a self-sustaining liquid sample of predetermined uniform width and for transferring the sample as a sample stripe to a sample carrier, a bounding structure including rectilinear edge boundaries and end boundaries for the sample and to which the sample may be retained by surface tension, said edge boundaries presenting opposed surfaces to the sample whereby when said bounding structure is contacted with the sample carrier, the sample is transferred intact to form a stripe, means serving to carry the bounding structure for movement between retracted and advanced positions to thereby bring said bounding structure into contact with said carrier, means for guiding the movement of said bounding structure, spring means for urging the bounding structure in retracted position, and means for positioning said apparatus adjacent the sample carrier.

3. Apparatus for forming a thin self-sustaining liquid film of predetermined uniform width and for transferring the same as a sample stripe to a sample carrier, a bounding structure including rectilinear edge boundaries and end boundaries for the film and to which the film may be retained by surface tension, said edge members presenting opposed line-like surfaces to the film and disposed in a plane coincident with the plane of the film, whereby when said structure is contacted with the sample carrier the liquid film is transferred intact to form a stripe means serving to carry the bounding structure for movement between retracted and advanced positions to thereby bring the bottom surface of said sample in contact with the carrier, means for guiding the movement of said bounding structure, spring means for urging the bounding structure into a retracted position, and means for positioning said apparatus adjacent the sample carrier.

4. In apparatus for forming a self-sustaining liquid sample of predetermined uniform width and for transferring the same as a sample stripe to a sample carrier, a bounding structure including a pair of spaced parallel wires to which the sample may be retained by surface force, said wires presenting opposed surfaces to the sample whereby when said boundaries are contacted with the sample carrier the sample is transferred intact to form a stripe, a bow serving to mount the wires and having its extremities attached to the ends of the wires, a frame having a pair of legs extending adjacent the ends of the bow, the extremities of said legs being notched for engagement with the member which carries the sample carrier, said legs forming guideways for the end portions of the bow, means for moving the bow with respect to the frame between retracted and advanced positions, said bow in its advanced position bringing said wires into contact with the sample carrier, and spring means serving to urge said bow towards the retracted position.

5. In apparatus for forming a self-sustaining liquid sample of predetermined uniform width and for transferring the sample to a sample carrier, a bounding structure serving to maintain said liquid sample by surface force, a bow serving to mount said bounding structure and having its extremities attached to the structure, a frame having a pair of legs extending adjacent the ends of the bow, the extremities of said legs being notched for engagement with a member which carries the sample carrier, said legs forming guideways for the end portions of the bow, means for moving the bow with respect to the frame between retracted and advanced positions, said bow in its advanced position bringing the bounding structure into contact with the sample carrier.

6. In a device for applying a liquid sample to a sample carrier, a bounding structure serving to carry the liquid sample, a bow having its extremities attached to the bounding structure, a frame having a pair of legs extending adjacent the ends of the bow, the extremities of said legs being notched for engagement with a member over which a paper strip is draped, said legs forming guideways for the end portions of the bow, means for moving the bow with respect to the frame between retracted and advanced positions, said bow in its advanced position bringing the bottom surface of said liquid sample into contact with the sample carrier, and spring means serving to urge said bow towards the retracted position.

References Cited in the file of this patent
UNITED STATES PATENTS

| | | |
|---|---|---|
| 461,821 | Edwards | Oct. 27, 1891 |
| 478,241 | Shaw | July 5, 1892 |
| 893,591 | Larsen | July 14, 1908 |
| 2,147,458 | Rohland | Feb. 14, 1939 |
| 2,634,359 | Terry | Apr. 7, 1953 |